Figure 1:
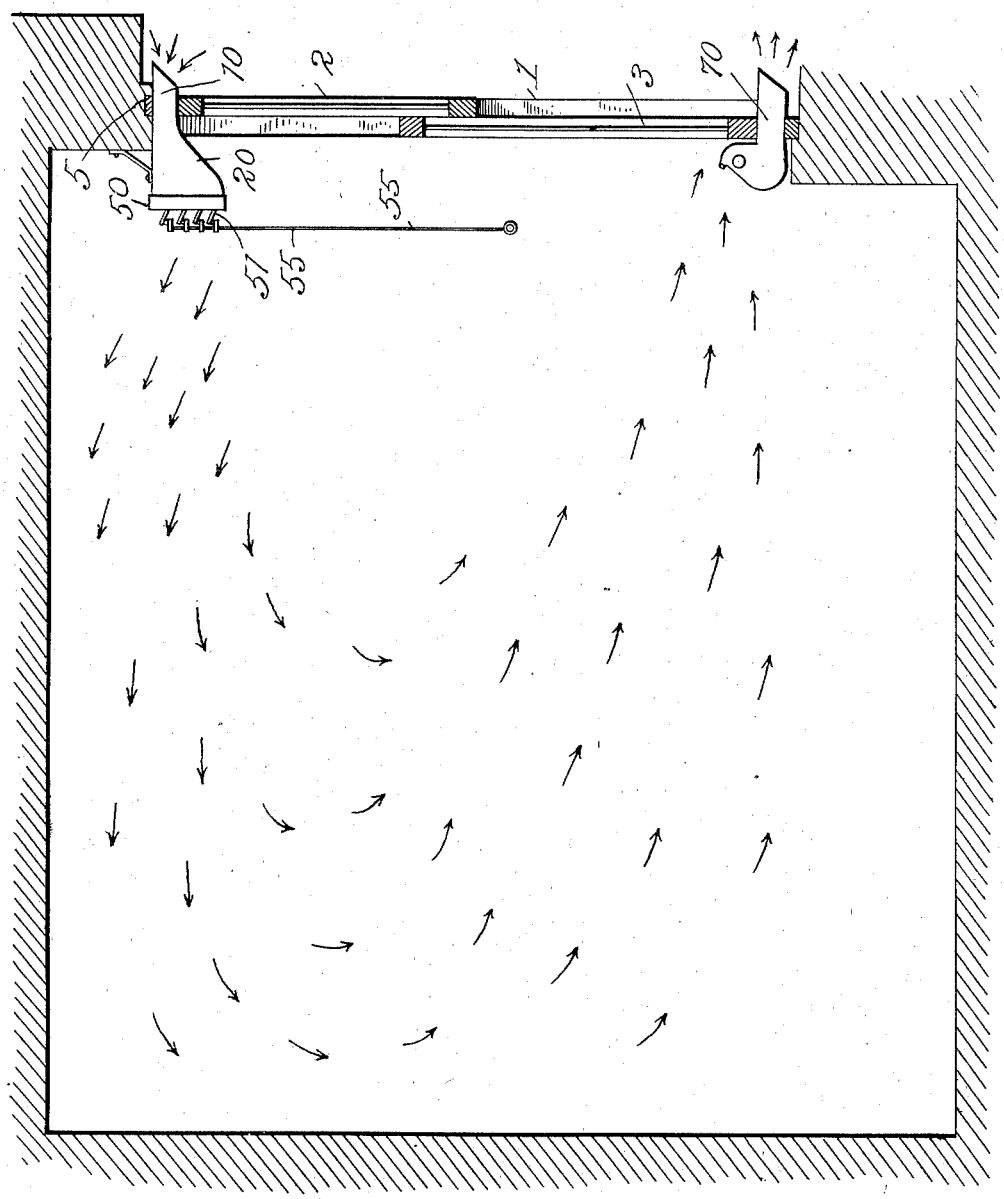

M. G. HUBBARD.
SYSTEM OF VENTILATION.
APPLICATION FILED NOV. 25, 1907.

929,767.

Patented Aug. 3, 1909.
2 SHEETS—SHEET 1.

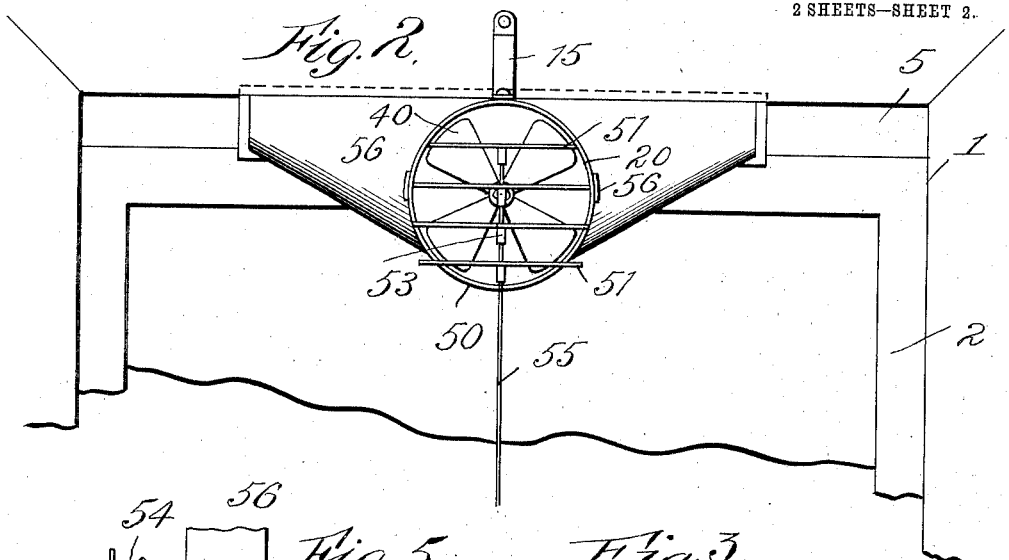
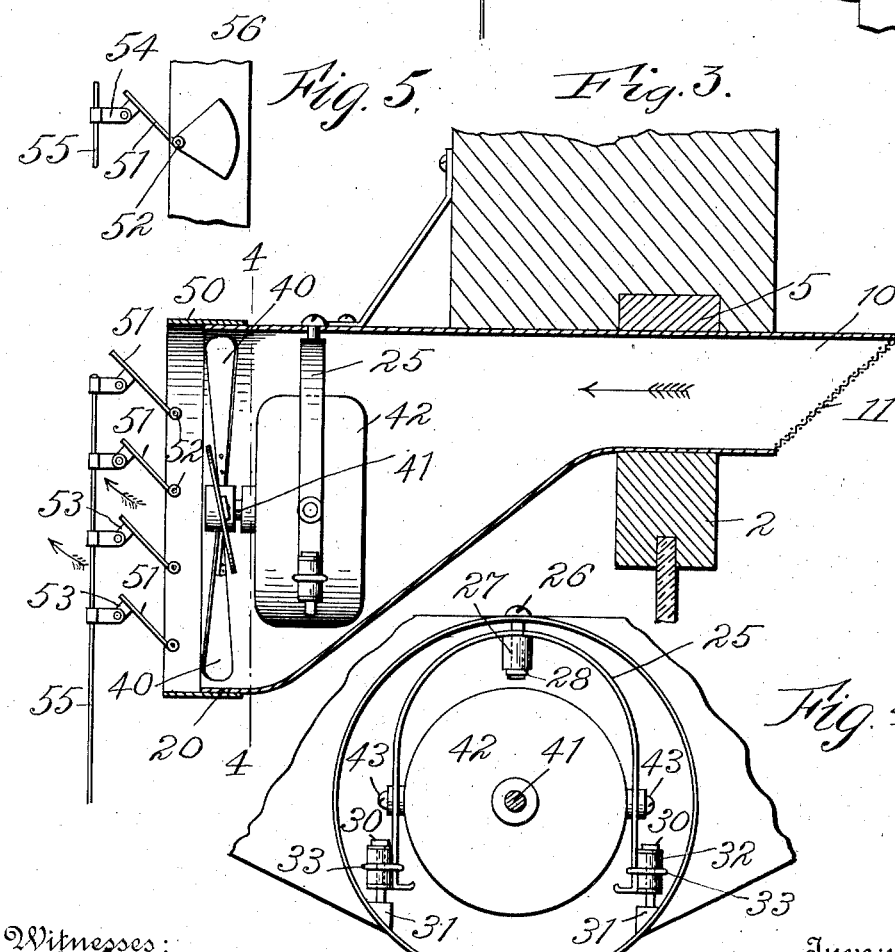

UNITED STATES PATENT OFFICE.

MOSES G. HUBBARD, OF CHATHAM, NEW JERSEY, ASSIGNOR, BY MESNE ASSIGNMENTS, TO MONARCH VENTILATOR COMPANY, OF NEW YORK, N. Y., A CORPORATION OF NEW YORK.

SYSTEM OF VENTILATION.

No. 929,767.  Specification of Letters Patent.  Patented Aug. 3, 1909.

Application filed November 25, 1907. Serial No. 403,632.

*To all whom it may concern:*

Be it known that I, MOSES G. HUBBARD, a citizen of the United States, residing at Chatham, county of Morris, and State of New Jersey, have invented certain new and useful Improvements in Systems of Ventilation, of which the following is a specification.

In ventilating rooms of buildings as now practiced, whether by the natural draft system or by the force draft system, the heated and foul air is removed from the room by a ventilator arranged at or near the top of the room, while the fresh air to take the place of the exhausted air is supplied to the room at or near the floor. This disposition of the outlet for the heated foul air, and of the inlet for the cool fresh air is a natural one because the heated air collects at the top of the room, and the cold air naturally gravitates to the bottom of the room; but such natural arrangement is objectionable for the reason that it is difficult to maintain the desired temperature in the room, and the occupants of the room are subjected to drafts incident to the admission of cold air to the coldest part of the room.

I have devised a system of ventilation which operates exactly the reverse of the natural systems above referred to in that fresh cold air is supplied to the top of the room where the air is warmest, and vitiated air is led from the room at a point or points nearer to the floor, and preferably adjacent to the level into which the vitiated air is exhaled into the room by the occupants. By this system the incoming fresh cold air is thrown into the warmest stratum of air in the room and becomes tempered by its contact with the warm air and causes a complete circulation of the air in the room in a direction or directions controlled by suitable devices, the vitiated air being forced out through a ventilator lower down in the room. In this manner the air of the room can be kept perfectly ventilated and the temperature retained at the desired point without so much waste of heat, and at the same time the occupants of the room will not be subjected to cold drafts.

In carrying my invention into practice I prefer to employ ventilators at the top and bottom of one or more windows in a room. The ventilator arranged at the top of the window opening is preferably in the form of a wide shallow fresh air duct, suitably mounted in the window opening by means of a filling block which supports the fresh air duct, said duct being conformed into cylindrical shape at its inner end within the room to afford a casing for a motor-driven fan by which fresh air is blown directly into the room adjacent to the ceiling. By an arrangement of shutters or slats arranged across the outlet opening of the fresh air duct, the direction and volume of the incoming current of fresh air can be regulated at will. The ventilator at the bottom of the window opening may be of any suitable form to permit the free outlet of the vitiated air expelled by the entrance of the fresh air forced into the top of the room by the fan.

In order that my invention may be fully understood, I will first describe the same with reference to the accompanying drawings, and afterward point out the novelty more particularly in the annexed claims.

In said drawings Figure 1 is a sectional view of a room illustrating my improved system of ventilation. Fig. 2 is a front elevation of the upper portion of a window showing my improved forced draft ventilator arranged therein. Fig. 3 is a vertical transverse sectional view of the same. Fig. 4 is a transverse sectional view taken on the line 4—4 of Fig. 3, and Fig. 5 is a detail view illustrating the brake for the adjustable slats or shutters.

In carrying out my improved system of ventilating rooms, which will be hereinafter fully explained, I mount a power driven ventilating fan in a ventilating casing in the upper part of a window opening, and a suitable ventilator to permit the free outlet of the vitiated air in the bottom of the window opening.

In addition to the general system of ventilation, my invention includes certain features of novelty in the construction and arrangement of the forced draft ventilator for supplying fresh air to the upper part of the room to be ventilated, and I will first describe the construction and arrangement of this forced draft ventilator, and afterward refer to the general system of ventilation with which the said ventilating apparatus is preferably employed.

1 is a window opening; 2 is the upper sash, and 3 the lower sash.

5 is a filling bar or block arranged across the window opening 1 above the top rail of the upper sash 2 and completely filling the window opening above the sash. This filling block or bar 5 has a wide shallow opening cut through it to receive the wide shallow fresh air inlet duct or pipe 10 of rectangular oblong cross section. This inlet pipe 10 has its outer end protected by an incline wire screen 11 of fine mesh, the upper wall of the pipe or conduit extending beyond the lower wall as shown so as to provide a suitable overhang to the entrance of the ventilating pipe. The wide shallow pipe 10 passes through the window opening and is supported at its inner end by any suitable bracket fastening, such as shown at 15, which rigidly connects the pipe to the inner face of the window frame. This fresh air inlet pipe 10 is gradually contracted in width and extended in height to form at its inner end a cylindrical pipe or casing 20, in which is mounted the power driven ventilating fan which will now be described.

25 is a yoke of inverted U-shape supported at the top within the cylindrical extension 20 of the ventilating pipe by means of a threaded bolt 26 which passes through the casing 20 and yoke 25, and has mounted on its inner end a cylindrical rubber block 27 secured in place by a nut 28. The yoke 25 is by this means supported upon the rubber cushion 27. The ends of the yoke 25 project downwardly adjacent to the vertical bolts or posts 30 suitably mounted upon lugs 31 formed on the inner face of the casing, said bolts 30 supporting cylindrical rubber blocks 32 against which the ends of the yoke 25 are yieldingly secured by elastic bands 33 as shown particularly in Fig. 4 of the drawings. By this means I provide a sound insulating cushioned frame or yoke for supporting the motor-driven fan, so that practically all the noise of the motor and fan is avoided. It will be noticed that the frame or yoke is firmly held against displacement either vertically or laterally.

40 is a fan mounted upon the shaft or axle 41 which is in common with the electric motor 42 which is hung at 43 within the yoke 25. The electric fan is of ordinary construction well known in the art, and usually referred to as a direct connected motor-driven fan.

The motor-driven fan 40 is arranged to draw air in through the ventilating pipe 10 and force it into the room adjacent to the ceiling.

A damper ring 50 is fitted upon the outer end of the cylindrical casing 20 and held in position upon the casing by its frictional contact therewith so as to remain in any adjusted position thereon. This damper ring 50 supports a plurality of transverse slats or shutters 51, each one of which is mounted upon a shaft 52 suitably journaled at its ends in the ring 50. Each slat or shutter 51 is provided with an outwardly projecting ear or lug 53 to which are pivotally connected the fingers 54 mounted upon a rod 55 which projects downwardly into the room in convenient position for manipulation.

One of the shafts 52 has secured upon its outwardly projecting ends the friction plates or brakes 56 as shown in Figs. 2 and 5, said friction plates 56 engaging the outer surface of the damper ring 50 for holding all of the connected shutter plates 51 in the desired adjusted position. It will be observed from this arrangement that the slats or shutters 51 may be adjusted to any angular relation in the outlet opening of the ventilating pipe so as to direct the incoming air upwardly or downwardly or horizontally, or they may completely close the same. By having the slats or shutters closed more or less the quantity of air can also be regulated, although I prefer to regulate the quantity of fresh air supplied by the speed of the motor which operates the fan. It will also be observed that by adjusting the damper ring 50 circumferentially upon the casing 20, I can deflect the incoming current of air laterally in the room to suit any specific location of the window in which the ventilator is mounted.

Referring now more particularly to Fig. 1 of the drawings, it will be observed that my improved forced draft ventilator is mounted at the top of the window opening for supplying fresh air to the upper part of the room, and that a foul air outlet ventilator is shown at 70 located at the bottom of the window opening to permit the exit of the foul air driven from the room by the supply of fresh air. This ventilator 70 at the bottom of the window opening may be of any suitable construction, but is preferably of the specific construction shown in my application filed November 25, 1907, Serial No. 403,631.

The general course of the air in my improved system of ventilation is indicated by the arrows in Fig. 1. The fresh air forced into the room by the motor-driven fan is thrown directly into contact with the heated air of the room and is thereby considerably tempered, and soon assumes the general temperature of the air in the room. The vitiated air is driven before the incoming current of fresh air as indicated by the arrows, and forced out through the ventilator at the bottom of the window opening. The quantity of air supplied to the room may be regulated by the speed of the motor-driven fan, and also by the adjustable dampers of the inlet and outlet ventilators. The quantity of air supplied should not be sufficient to subject the occupants of the room to too great a draft, although the draft will not be ordinarily noticed, since the fresh air is first warmed before it reaches the lower parts of the room in which the occupants are.

The main feature of importance in my invention is the novel system of ventilation by which the fresh air is introduced into the room at the top where the temperature is greatest, by which the fresh air is tempered before reaching the occupants of the room. This arrangement is also important because it economizes the use of heat, since the heat from the exhausted air is utilized for warming up the fresh air, before the exhausted air is expelled from the room.

The exact arrangement and construction of the forced draft ventilator adapted to be mounted at the top of a window opening is another important feature of my invention; the broad shallow ventilating conduit being readily mounted above the upper sash of a window and secured in place upon the window frame without requiring any alteration in the window or any considerable difficulty in fastening the parts in place. The exact shape of this fresh air supply conduit is of importance in that it affords a proper casing for the direct connected motor-driven fan by which the air is supplied to the room. The specific mounting of the fan is of importance in doing away with the objectionable noise of the fan which would certainly result if it were directly mounted upon the metal casing of the fresh air conduit. The specific arrangement of adjustable slats or shutters for controlling the direction and quantity of the air is also of importance in carrying out my invention.

It will be understood that a motor-driven fan, to meet the requirements of my invention, should ordinarily be equipped with a suitable controller switch by which the speed of the fan can be regulated to a nicety, so as to get the best results with the least expense. I have not shown such a controlling switch, since they are well known in the art.

What I claim is:

1. A window ventilator comprising a wide shallow air duct or conduit adapted to extend through a window or other wall opening and conformed at its inner end into approximately cylindrical shape, and a motor-driven fan mounted in the cylindrical portion of said conduit.

2. A window ventilator comprising a wide shallow air duct or conduit adapted to extend through a window or other wall opening and contracted laterally and expanded vertically at its inner end, and a motor-driven fan mounted in the inner portion of said conduit.

3. A window ventilator comprising a wide shallow air duct or conduit adapted to extend through a window or other wall opening and conformed at its inner end into cylindrical shape, a filling block fitting the window opening and supporting said conduit, and a motor-driven fan supported in the cylindrical portion of said conduit, and means for regulating said fan.

4. A window ventilator comprising a wide shallow air duct or conduit adapted to extend through a window or other wall opening and conformed at its inner end into cylindrical shape, a window filling block in which said conduit is mounted, a motor-driven fan supported in the cylindrical portion of said conduit, and means for regulating the direction and quantity of air passing through said conduit.

5. In a ventilator, the combination of an air supply pipe or conduit, a motor-driven fan arranged in said pipe or conduit, a yoke or frame upon which said fan is mounted, and a plurality of elastic cushions interposed between the yoke and conduit at a plurality of points.

6. In a ventilator, the combination of an air supply pipe or conduit, with a motor-driven fan supported therein, an inverted U-shaped yoke or frame upon which said fan is mounted, an elastic cushion supporting said U-shape frame at top, and elastic cushions interposed between the pipe or conduit and the legs of said yoke or frame for preventing lateral displacement of the fan, substantially as set forth.

MOSES G. HUBBARD.

Witnesses:
WM. E. KNIGHT,
JOSEPH J. SCHMIDT.